US011248097B2

(12) United States Patent
Steelman et al.

(10) Patent No.: US 11,248,097 B2
(45) Date of Patent: Feb. 15, 2022

(54) GRAPHIC ARTICLE

(71) Applicant: 3M INNOVATIVE PROPERTIES COMPANY, St. Paul, MN (US)

(72) Inventors: Ronald S. Steelman, Woodbury, MN (US); Keith R. Lyon, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 466 days.

(21) Appl. No.: 14/761,751

(22) PCT Filed: Jan. 31, 2014

(86) PCT No.: PCT/US2014/014009
§ 371 (c)(1),
(2) Date: Jul. 17, 2015

(87) PCT Pub. No.: WO2014/123766
PCT Pub. Date: Aug. 14, 2014

(65) Prior Publication Data
US 2016/0002418 A1 Jan. 7, 2016

Related U.S. Application Data

(60) Provisional application No. 61/761,004, filed on Feb. 5, 2013.

(51) Int. Cl.
*C08J 5/18* (2006.01)
*C08L 29/14* (2006.01)
*C08L 75/04* (2006.01)
*C09J 7/22* (2018.01)
*B32B 27/08* (2006.01)
*B44C 1/10* (2006.01)
*B32B 27/40* (2006.01)
*B32B 27/22* (2006.01)
*B32B 27/42* (2006.01)
*B32B 37/12* (2006.01)
*C08K 5/00* (2006.01)

(52) U.S. Cl.
CPC ............... *C08J 5/18* (2013.01); *B32B 27/08* (2013.01); *B32B 27/22* (2013.01); *B32B 27/40* (2013.01); *B32B 27/42* (2013.01); *B32B 37/12* (2013.01); *B44C 1/105* (2013.01); *C08L 29/14* (2013.01); *C08L 75/04* (2013.01); *C09J 7/22* (2018.01); *B32B 2307/712* (2013.01); *B32B 2405/00* (2013.01); *B32B 2451/00* (2013.01); *B32B 2605/00* (2013.01); *C08J 2329/10* (2013.01); *C08J 2475/06* (2013.01); *C08K 5/0016* (2013.01); *C09J 2203/306* (2013.01); *C09J 2301/41* (2020.08); *C09J 2459/006* (2013.01); *C09J 2475/006* (2013.01)

(58) Field of Classification Search
CPC .......... C08L 75/04; C08L 75/06; C08L 75/08; C08L 75/10; C08L 75/12; C08L 75/14; C08L 75/16; C08L 29/14; C08J 2475/04; C08J 2475/06; C08J 2475/08; C08J 2475/10; C08J 2475/12; C08J 2475/14; C08J 2475/16; C08J 2329/00; B44C 1/105; B32B 27/08; B32B 27/22; B32B 27/42; B32B 2605/00; B32B 2451/00; B32B 2405/00
See application file for complete search history.

(56) References Cited

U.S. PATENT DOCUMENTS

| | | | |
|---|---|---|---|
| 2,229,222 A * | 1/1941 | Reid | B32B 17/10605 560/263 |
| 2,736,721 A | 2/1956 | Dexter | |
| RE24,906 E | 12/1960 | Ulrich | |
| 4,181,752 A | 1/1980 | Martens | |
| 4,418,120 A | 11/1983 | Kealy | |
| 4,833,179 A | 5/1989 | Young | |
| 4,968,562 A | 11/1990 | Delgado | |
| 4,994,322 A | 2/1991 | Delgado | |
| 5,028,658 A | 7/1991 | David | |
| 5,141,790 A | 8/1992 | Calhoun | |
| 5,209,971 A | 5/1993 | Babu | |
| 5,212,014 A * | 5/1993 | David | B32B 27/08 264/176.1 |
| 5,296,277 A | 3/1994 | Wilson | |
| 5,362,516 A | 11/1994 | Wilson | |
| 5,461,134 A | 10/1995 | Leir | |
| 5,539,054 A | 7/1996 | LaFleur | |
| 5,661,511 A | 8/1997 | Kashiwazaki et al. | |
| 8,197,928 B2 * | 6/2012 | Volpp | B32B 17/10036 136/244 |

(Continued)

FOREIGN PATENT DOCUMENTS

DE 2420355 11/1974
EP 0570515 11/1993

(Continued)

OTHER PUBLICATIONS

International Search Report for PCT/US2014/14009, dated May 12, 2014, 2 pages.
Cascone, "Blends of Polypropylene with Poly(vinyl butyral)," Journal of Applied Polymer Science, 2001, vol. 82, pp. 2934-2946.
Handbook of Pressure-Sensitive Adhesives, Ed. D. Satas, 2nd Edition, Von Nostrand Reinhold, New York, 1989.
Encyclopedia of Polymer Science and Engineering, vol. 13, Wiley-Interscience Publishers, New York, 1988.
Encyclopedia of Polymer Science and Engineering, vol. 16, Wiley-Interscience Publishers, New York, 1964.

(Continued)

Primary Examiner — Scott R. Walshon
(74) Attorney, Agent, or Firm — Vincent Pham

(57) ABSTRACT

Articles useful as graphic films are presented. Specifically, the present disclosure is directed to an article comprising a film layer, the film layer comprising a polymer blend comprising a thermoplastic polyurethane and a polyvinyl butyral, and an adhesive layer adjacent the film layer.

22 Claims, No Drawings

(56) References Cited

U.S. PATENT DOCUMENTS

| | | | |
|---|---|---|---|
| 8,349,437 B2 | 1/2013 | Schneider | |
| 2003/0180505 A1 | 9/2003 | Abe et al. | |
| 2003/0194566 A1 | 10/2003 | Corzani | |
| 2006/0063673 A1 | 3/2006 | Hidetoshi | |
| 2008/0210287 A1* | 9/2008 | Volpp | B32B 17/10036 136/244 |
| 2009/0017287 A1 | 1/2009 | Guo et al. | |
| 2010/0092759 A1 | 4/2010 | Fan et al. | |
| 2010/0116416 A1 | 5/2010 | Grussaute-Nghiem | |
| 2010/0273012 A1* | 10/2010 | Moriguchi | C08L 23/0815 428/437 |

FOREIGN PATENT DOCUMENTS

| | | |
|---|---|---|
| EP | 0617708 | 10/1994 |
| ES | 2294957 | 4/2008 |
| JP | H10-86313 | 4/1998 |
| JP | H10-147098 A | 6/1998 |
| JP | 2004-122365 | 4/2004 |
| KR | 2006-0083662 | 7/2006 |
| WO | WO 1995-13331 | 5/1995 |
| WO | WO 1996-01687 | 1/1996 |
| WO | WO 1998-29516 | 7/1998 |
| WO | WO 2002-18154 | 3/2002 |
| WO | WO 2004-018197 | 3/2004 |
| WO | WO 2007-079160 | 7/2007 |
| WO | WO 2011/029544 | 3/2011 |
| WO | WO 2013-019699 | 2/2013 |
| WO | WO 2013-019706 | 2/2013 |
| WO | WO 2013-019766 | 2/2013 |
| WO | WO 2013-019772 | 2/2013 |

OTHER PUBLICATIONS

Xi Tao et al., "Surface Decoration of Glass (Second Edition)", edited by Chengyu Wang, National Defense Industry Press, pp. 123-124, $2^{nd}$ edition of $1^{st}$ printing in Jan. 2011.

* cited by examiner

GRAPHIC ARTICLE

FIELD

This invention relates to film articles, their method of production and their use as graphic films.

BACKGROUND

Graphic films are used, for example, to apply designs, e.g. images, graphics, text and/or information, on windows, buildings, pavements or vehicles such as autos, vans, buses, trucks, streetcars and the like for e.g. advertising or decorative purposes. Many of the surfaces, e.g. vehicles, are irregular and/or uneven.

For graphic films, it is desirable to have a film that accommodates curves, depressions or projections on a substrate surface so that the film may be stretched around curves or projections, or may be pressed down into depressions without breaking or de-laminating the film. This characteristic is generally referred to as conformability. It is also desirable that the film and adhesive composite does not release from the substrate surface after application (known as popping-up). Graphic films may be of any color. Graphic films may also be imageable (i.e. able to receive printing and/or graphics) and exhibit good weathering for outdoor applications.

Polyvinyl chloride (PVC) films are conventionally used for a wide of variety of applications including graphic films. PVC has many properties that are advantageous for such applications and are easily printed using current printing technologies, e.g. piezo ink jet. For example, PVC graphic films are conformable to the varying topographies present on the exterior of a substrate, e.g. a vehicle. However, in some cases the application of halogen-containing plastics may be undesirable for environmental reasons.

Polyolefin films and their corresponding use as graphic films are advantageous in that they typically do not contain halogens. However, polyolefin films are difficult to image and thus may require the application of an additional image receptive layer, such as an ink receptive layer, toner receptive layer, primer layer or the like. Furthermore, polyolefin films are more difficult to apply to contoured surfaces because they tend to be either elastic which results in debonding or "popoff" failures, or, exhibit a significant yield point which distorts the graphic during application. Many polyolefin films do not exhibit adequate weather resistance for extended outdoor applications.

SUMMARY

The present application is directed to articles useful as graphic films. Specifically, the present application is directed to an article comprising a film layer, the film layer comprising a polymer blend comprising thermoplastic polyurethane and a polyvinyl butyral, and an adhesive layer adjacent the film layer.

In some embodiments, the film is plasticized with a typical plasticizer. Most often, the plasticizer is polymeric.

The film layer may additionally comprise pigments, fillers, rheology modifiers, surface modifiers, UV absorbers, anti-oxidants, and the like. In some embodiments, the film layer is hot melt processable.

In some embodiments, the adhesive layer is a topologically structured adhesive layer. In some embodiments, a primer layer in placed between the adhesive layer and the film layer. In some embodiments, a release liner is adjacent the adhesive layer opposite the film layer. In some embodiments, the article has any combination of these characteristics.

In some embodiments, the article is fixed to a substrate. In some embodiments, the substrate is a vehicle. In some embodiments, the substrate is a textured surface. In some embodiments, the surface is curved in one or two directions. In some embodiments, the surface has any combination of these characteristics.

DESCRIPTION

Articles of the present invention comprise a film, an adhesive layer on one major surface of the film; and optionally, a release liner on the adhesive layer.

The film according to the invention comprises a polymer blend. The blend comprises thermoplastic polyurethane and a polyvinyl butyral. The polyvinyl butyral may, for example, be of varying molecular weight or varying levels of residual vinyl alcohol. Generally, the film is hot melt processable. Other materials may additionally be blended into the polymer blend. The thermoplastic polyurethane may be aliphatic or aromatic. Useful thermoplastic polyurethanes include, for example, those sold under the tradename KRYSTALGRAN PN3429-218 and KRYSTALGRAN PNO3-217 from Huntsman Polyurethanes (an international business unit of Huntsman International LLC), The Woodlands, Tex.; TEXIN 3044 from Bayer Corporation, Pittsburgh, Pa., and ESTANE ALR-C87A by Lubrizol Advanced Materials, 9911 Brecksville Rd, Cleveland, Ohio 44141.

The polymer blend of the present application exhibits good outdoor weatherability. It is surprising, given that polyvinyl butyral is not outdoor weatherable when exposed to the environment. For the purpose of the present application, a film is outdoor weatherable when it survives environmental, outdoor exposure without significant discoloration or degradation of the polymer film surface for at least 1 year, for example at least 2 years. Examples of degradation include decrease in gloss or cracking of the film surface. Significant discoloration includes visually noticeable increases in yellowness or browning.

Blending of the polyurethane and polyvinyl butyral materials is done by any method that results in a suitable mixture of the polymers. In some embodiments, the mixture is a multi-phase system. The polymers can be blended using several methods. In particular, the polymers can be blended by melt blending or solvent blending Examples of melt blending include single screw extruding, twin screw extruding, calendering, or an internal mixer (e.g. those sold under the tradename BANBURY.) In solvent blending, the polymers in the blend should be substantially soluble in the solvent used.

The thermoplastic polyurethane may be present in the blend in amounts greater than 10% by weight and in some embodiments up to 80% by weight. The weight percentage of the thermoplastic polyurethane is based on total weight of the polyurethane and the polyvinyl butyral. The optimum blend ratio is generally determined by prioritization of the desired characteristics of the film. Materials with higher levels of polyurethane tend to stretch more evenly but are more elastic. Materials that are highly elastic have a greater tendency to debond or "pop off" after application. Materials with less elasticity are more likely to stretch unevenly and distort the graphic during application. Specific examples of blends and their characteristics can be seen in the examples section herein.

Plasticizers are often included in the film to adjust the mechanical and thermal characteristics. Films that are most useful can be stretched at room temperature but are not so soft that they cannot be easily handled without stretching. Additionally, plasticizers can improve the compatibility of components and reduce cracking upon weathering.

Pigments may be used to modify the optical properties of the film such as color, opacity and to improve UV weathering resistance. Suitable pigments include, for example, titanium dioxide, carbon black, or any commercially available pigments. Typically pigments are generally used in amounts from 0.5 up to about 40% by weight of the total film weight. In some embodiments, the pigment is present in about 10-25% be weight of the film, for example when a white pigment is used.

Fillers may be used to extend the polymer blend or modify properties of the film, such as to improve tear properties, increase stiffness, improve fire resistance or reduce surface tack of the films. Examples of fillers include calcium carbonate, silicates, silico-aluminates, antimony trioxide, mica, graphite, talc and other similar mineral fillers, ceramic microspheres, glass or polymeric beads or bubbles, metal particles, fibers, starch and the like. Fillers are typically used in amounts of from 0.5 up to about 40% by weight of the total film weight, for example over 10% by weight.

The film may additionally comprise ultraviolet light absorbers, ultraviolet light stabilizers, heat stabilizers and/or antioxidants to further enhance protection against environmental aging caused by ultraviolet light or heat. Ultraviolet light (UV) absorbers include hydroxyphenylbenzotriazoles and hydroybenzophenones. Stabilizers are commonly hindered amine light stabilizers (HALS). Antioxidants include, for example, hindered phenols, amines, and sulfur and phosphorus hydroxide decomposers. Typically such additives are used in amounts of about 0.1 up to about 5% by weight of the total film weight.

The film can be formed using any conventional method known to those skilled in the art. For example, the film can be formed using melt extrusion techniques. Extrusion is a known method of manufacturing films. Extrusion means, for the present application, the melt processing of molten streams to form a film. Co-extrusion means that multiple streams are present simultaneously, and then combined into a single unified structure, or coextruded film. Examples of extrusion processes include single or multilayer extrusion using either cast extrusion or blown film extrusion. Cast extrusion can use fixed or movable element dies. Materials may be melt processed by multiple steps that may include pre-mixing only some of the components found in the final sheet. Other components may be introduced later in the extrusion process.

The process is run generally by processing the feedstock at or above its melt temperature through the die, resulting in a film. A coextruded film is generally a composite of all the molten feedstocks placed within the co-extrusion process.

The films may, alternatively, be formed via coating using a solvent-based method. For example, the blend can be coated by such methods as knife coating, roll coating, gravure coating, rod coating, curtain coating and air knife coating. The coated solvent-based blend is then dried to remove the solvent, for example at elevated temperatures, such as those supplied by an oven, to expedite drying.

The film may further be processed, for example by orientation. One example of orientation of a film is biaxial orientation. Biaxial orientation involves stretching the film in two directions perpendicular to each other, generally in the down-web direction and cross-web direction. In a typical operation, the freshly extruded molten film is fed onto a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first.

The film may also be subjected to other treatments that are commonly used for films today, such as radiation curing, post heating, or additional coating layers to enhance adhesion, printing, color, and the like.

The film may be a multi-layer film construction. In such an embodiment, the layers of films may be different materials, or the same material with different additives, or the same materials with different ratios of a blend. For example, a multilayer film construction may be made with a film layer comprising the polymer blend of the present application and a second film layer. The second film layer may comprise the polymer blend of the present application or a different polymer or blend, and may include a pigment in one of the film layers. Specifically, a film may comprise a clear layer over a white layer, or a white layer over a different pigment color. For the purpose of the present application, where the specification states "film", it encompasses single layer as well as multi-layer films.

In some embodiments, an adhesive layer is applied to one surface of the film. The adhesive layer may be activated by pressure, heat, solvent or any combination thereof and may be of a type based on a poly- -olefin, a block copolymer, an acrylate, a natural or synthetic rubber resin or a silicone. When a pressure sensitive adhesive (PSA) layer is used, PSA's useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly- -olefins, and tackified silicones. The adhesive layer may be non-tacky or low in tack and room temperature and become sticky at the application temperature.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm$^2$). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. In some embodiments, the adhesive may be coextruded with the film and optionally the release liner. The adhesive layer may be applied as a continuous layer, or a patterned, discontinuous layer. The adhesive layer typically has a thickness of about 5 to about 50 micrometers.

Examples of adhesives include PSA's, hot melt or heat activated adhesives that are pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and U.S. Pat. No. 5,141,790 (Calhoun et al) and WO 96/1687 (Keller et al) and any other type of PSA disclosed in *Handbook of Pressure-Sensitive Adhesives*, Ed. D. Satas, 2$^{nd}$ Edition, Von Nostrand Reinhold, New York, 1989. Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester), and U.S. Pat. No. 5,461,134 (Leir et al) and in the *Encyclopedia of Polymer Science and Engineering*, vol. 13, Wiley-Interscience Publishers, New York, 1988, and *Encyclopedia of Polymer Science and Engineering*, vol. 13, Wiley-Interscience Publishers, New York, 1964. Acrylate-based PSA's which are particularly useful in the present include those described in U.S. Pat. No. 4,181,752 (Clemens et al) and U.S. Pat. No. 4,418,120 (Kealy et al), WO 95/13331 and in *Handbook of Pressure-Sensitive Adhesives*, Ed. D. Satas, $2^{nd}$ Edition.

In some embodiments, the adhesive layer is a repositionable adhesive layer. For the purposes of the present application, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one micro-structured surface. Upon application of a film article comprising such a structured adhesive layer to a substrate surface, a network of channels or the like exists at least temporarily between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a micro-structured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident micro-structured release liner to protect the adhesive pegs during storage and processing. The formation of the micro-structured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organo-silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a micro-structured or micro-embossed pattern for imparting a structure to the adhesive layer.

In one embodiment, the article of the present application may be made by providing a film comprising a thermoplastic urethane and a polyvinyl butyral and applying an adhesive layer onto the first major surface of the film. In some embodiments, the adhesive layer is then covered with a release liner to form the film article. In another embodiment, an adhesive layer is covered with a release liner prior to being applied to the film, and then the adhesive layer/release liner is applied onto the first major surface of the film to form the film article.

Because in some embodiments the film is imageable, i.e. can receive an ink layer, the films of the present application can be advantageously used as graphic films. An imaged graphic film comprising a thermoplastic urethane and a polyvinyl butyral, wherein the film is imaged is particularly useful in various graphic applications.

A method of providing a graphic film with a design, e.g. an imaged graphic film, comprises providing a film comprising a thermoplastic urethane and a polyvinyl butyral and providing an ink layer on at least one surface of the film. In some embodiments, the ink layer creates a design.

Imaging techniques suitable for imaging the film include ink jet printing, thermal mass transfer, flexography, dye sublimation, screen printing, electrostatic printing, offset printing, gravure printing or other printing processes. Useful inks include piezo ink-jet inks, thermal transfer inks, ultraviolet curable inks, solvent based inks and latex inks.

A top coat may also be employed as a functional layer. The top coat may be polymeric, and, for example, may be made of polyurethanes, polycarbonates or polyacrylics. A topcoat may be used to modify surface characteristics, such as gloss or abrasion resistance, but may also be used as a protective layer, for example over an image.

A protective film may be employed instead of a top coat. The protective film could be of any material that provides desired characteristics, but would most preferably be a film that does not detract from the superior characteristics of the graphic film as described. Such a film could be a film of similar composition without pigment.

The film may also be treated with a conventional primer coating, and/or activated by flame or corona discharge, and/or by other surface treatment to enhance adhesion of a functional layer, an ink layer, and/or the adhesive layer thereto.

Composite combinations of printed or colored base film with protective clear layers of either coatings or films must retain all properties required in a finished graphic. For example, a compliant base film when combined with a non-compliant top film may not meet the requirements for a graphic film for auto decoration when such an application requires compliance. Therefore, for many applications, combinations are limited because the final article will no longer meet the requirements. To that end, a clear film of the present invention is most advantageous when combined with a white printable film of the present invention. The composition is then better suited to the final application. The clear film can provide the resistance to scratching and weathering, and the white base film can provide print receptivity and print adhesion. Alternatively, a clear film could be combined with a printable clear film for applications which require an ink layer on a clear film such as for a window graphic. In other embodiments, the clear print film may possess all the characteristics required by the final composite, thus only a single film would be required. The film of the present invention can be modified by changing the resin ratios, plasticizer type and amount, the pigment loading and type, as well as resin types within the described resin families to adjust the properties needed. Film thicknesses, adhesive type and adhesive thickness can additionally be adjusted such that the graphics film as used in its preferred state possesses the properties needed for the application and use of the graphic film composite.

Because the film exhibits excellent weathering properties, the films as well as imaged graphic films according to the invention are advantageously suitable for outdoor graphic applications. For example, an imaged graphic film adhered to a substrate is particularly advantageous, wherein the imaged graphic film is exposed to an outdoor environment.

A method of providing a substrate with a graphic design comprises providing a film comprising a thermoplastic polyurethane and a polyvinyl butyral; providing an ink layer on at least one surface of the film, for example imaging a surface of film with a design to form an imaged graphic film, and applying the imaged graphic film to a surface of the substrate.

The imaged graphic film may be heated and then said film is adhered to the surface of the substrate, and in some embodiments the imaged graphic film is heated as said film is adhered to the surface of the substrate. The heated imaged graphic film can be more easily conformed to the contours of the surface of the substrate by stretching the film around curves or projections and/or pressing the sheet material down into depressions. Generally, the heating may be performed at a temperature of up to about 140° C., for example at a temperature of about 40° C. to about 120° C. Because the imaged graphic films adhered to a substrate exhibit a low tendency towards popping up, the described methods and the adhered graphic films are especially desirable for substrates having an irregular, rough and/or uneven surface, for example a curved surface or a textured masonry surface. In specific embodiments, the substrate is a vehicle, a window, a building, or pavement.

In certain situations, it can be advantageous to be able to easily remove a film from a substrate surface after application. In order to enhance removability, the films of the present invention may have a tensile at break of greater than the adhesion strength at removal temperature.

This application can be described as including the following aspects:

In a first aspect, the application comprises an article comprising a film layer, the film layer comprising a polymer blend comprising a thermoplastic polyurethane and a polyvinyl butyral; and an adhesive layer adjacent the film layer.

In a second aspect, the article of the first aspect, wherein the thermoplastic polyurethane is an aliphatic urethane.

In a third aspect, the article of any previous aspect wherein the thermoplastic polyurethane is an aromatic urethane.

In a fourth aspect, the article of any previous aspect wherein the film layer comprises a plasticizer.

In a fifth aspect, the article of any previous aspect wherein the film layer comprises a polyester plasticizer.

In a sixth aspect, the article of any previous aspect wherein the film layer comprises a colorant.

In a seventh aspect, the article of any previous aspect wherein the film layer is hot melt processed.

In an eighth aspect, the article of any previous aspect wherein the adhesive layer is a structured adhesive layer.

In a ninth aspect, the article of any previous aspect comprising a primer layer between the adhesive layer and the film layer.

In a tenth aspect, the article of any previous aspect comprising a release liner adjacent the adhesive layer opposite the film layer.

In an eleventh aspect, the article of any previous aspect 1 comprising an image on the film layer.

In a twelfth aspect, the article of any previous aspect wherein the article is fixed to a substrate.

In a thirteenth aspect, the article of any previous aspect wherein the substrate is a vehicle.

In a fourteenth aspect, the article of any previous aspect wherein the substrate is a rough surface.

In a fifteenth aspect, the article of any previous aspect wherein the substrate has a compound curved surface.

In a sixteenth aspect, the article of any previous aspect wherein the film layer is multiple layers.

In a seventeenth aspect, the article of any previous aspect where one of the layers comprises a thermoplastic urethane and a polyvinyl butyral.

In an eighteenth aspect, the article of any previous aspect comprising a protective clear layer on the image.

In a nineteenth aspect, the article of any previous aspect comprising a film layer, the film layer comprising a polymer blend comprising a thermoplastic polyurethane and a polyvinyl butyral, wherein the film is less than 5 mil thick.

In the next aspect, the article of any previous aspect in a method of displaying a graphic comprising providing a substrate with an irregular surface; applying the article of any previous aspect to the substrate, wherein the adhesive layer adheres the adhesive article to the substrate.

In another aspect, the substrate is a vehicle.

In another aspect, the substrate is a rough surface.

In another aspect, the film layer is outdoor weatherable.

EXAMPLES

These examples are merely for illustrative purposes only and are not meant to be limiting on the scope of the appended claims. All parts, percentages, ratios, etc. in the examples and the rest of the specification are by weight, unless noted otherwise.

| MATERIALS | |
|---|---|
| PU 1 | KRYSTALGRAN PN3429-218, an aliphatic thermoplastic polyurethane based on polyester with a Shore A Durometer of 90, and having a tensile strength of 55.1 MPa (8000 psi), an ultimate elongation of 450%, a tensile modulus at 100% elongation of 5.5 MPa (800 psi), a |

-continued

| | MATERIALS |
|---|---|
| | thermal melt range of 90-130° C. (105-265° F.); available from Huntsman Polyurethanes (an international business unit of Huntsman International LLC), The Woodlands, Texas. |
| PU 2 | KRYSTALGRAN PN03-217, an aliphatic thermoplastic polyurethane based on polycaprolactone with a Shore A Durometer of 92, and having a tensile strength of 52 MPa (6500 psi), an ultimate elongation of 450%, a tensile modulus at 100% elongation of 7 MPa (1050 psi), and a softening range of 90-125° C. (194-257° F.); available from Huntsman Polyurethanes (an international business unit of Huntsman International LLC), The Woodlands, Texas. |
| PU 3 | ESTANE ALR CL87A TPU, an aliphatic, polycaprolactone-based thermoplastic urethane (TPU) with a Shore A Durometer of 85-90, and having a tensile strength of 62.2 MPa (9015 psi), an ultimate elongation of 410%, and a tensile modulus at 100% elongation of 6.9 MPa (1000 psi); available from Lubrizol Advanced Materials, Inc., Cleveland, Ohio. |
| PU 4 | TEXIN 3044, an aliphatic polyester-based thermoplastic polyurethane with a Shore A Durometer of 92, and having a tensile strength of 29.0 MPa (4200 psi), an ultimate elongation of 440%, a tensile modulus at 100% elongation of 8.3 MPa (1200 psi), a Vicat softening temperature of 39° C. (102° F.), and a Tg (DMA) of −20° C. (−4° F.); available from Bayer MaterialScience LLC, Pittsburgh, Pennsylvania. |
| PVB1 | Mowital 75H, Polyvinyl Butyral powder with a polyvinyl alcohol content of 18-21% and a polyvinyl acetate content of 1-4% and a glass transition temperature of 73° C. |
| PVB2 | Mowital 60H, Polyvinyl Butyral powder with a polyvinyl alcohol content of 18-21% and a polyvinyl acetate content of 1-4% and a glass transition temperature of 70° C. |
| PVB3 | Mowital 60HH, Polyvinyl Butyral powder with a polyvinyl alcohol content of 12-16% and a polyvinyl acetate content of 1-4% and a glass transition temperature of 65° C. |
| PVB4 | Mowital 60T, Polyvinyl Butyral powder with a polyvinyl alcohol content of 24-27% and a polyvinyl acetate content of 1-4% and a glass transition temperature of 72° C. |
| PVB5 | Mowital 45H, Polyvinyl Butyral powder with a polyvinyl alcohol content of 18-21% and a polyvinyl acetate content of 1-4% and a glass transition temperature of 69° C. |
| PVB6 | Butvar B-90, Polyvinyl Butyral powder with a polyvinyl alcohol content of 18.5-20.5% and a glass transition temperature of 72-78° C. |
| A1 | PARAPLEX A-8600 Polyester Adipate, a medium molecular weight polymeric ester; available from the HallStar Company, Chicago, Illinois. |
| A2 | ADMEX 770, a medium-to-high molecular weight polymeric plasticizer based on a blend of adipic and phthalic acid; available from Velsicol Chemical, LLC, Rosemont, Illinois. |
| A3 | Paraplex G-57, is an intermediate molecular weight polyester; available from the HallStar Company, Chicago, Illinois |
| A4 | Paraplex UVC, is a medium to low molecular weight polyester plasticizer; available from the HallStar Company, Chicago, Illinois |
| A5 | Kronos 2160. Production rutile titanium dioxide pigment produced by the chloride process with a surface treatment of aluminium and silicon compounds. TiO2 content (ISO 591) ~90.5% |
| 3545 C | 3M CONTROLTAC Removable Graphic Film with COMPLY Adhesive 3545C, a 0.10 mm (0.004 in.) thick, white, opaque polyolefin film having a matte finish and having on one side a 0.013 to 0.025 mm (0.0005 to 0.001 in.) thick, clear colored, slideable and positionable, pressure-activated adhesive with air release channels, available from 3M Company, St. Paul, Minnesota. |
| IJ 180-10 | 3M CONTROLTAC Graphic Film IJ 180-10, a white, opaque cast vinyl film having a thickness of 0.05 mm (0.002 in.); available from 3M Company, St. Paul, Minnesota. |
| Clear PVC | SCOTCHCAL ELECTROCUT Graphic Film 7725-114, a 0.051 mm (0.002 inch) thick, cast clear vinyl film with a 0.063 to 0.09 mm (0.0025 to 0.0035 inch) thick clear pressure sensitive adhesive on one side, which is provided with a transparent synthetic liner over the adhesive, the liner being removed prior to application, available from 3M Company, St. Paul, Minnesota. |
| Base metal panel | An etched, desmutted, flashed anodized aluminum panel measuring 0.63 cm thick by 7.0 cm wide by 27.9 cm long (0.25 by 2.75 by 11 inches), obtained from Q-Panel Lab Products, Cleveland, Ohio. |
| 3640 GPS-114 | 3M SCOTCHCAL Gloss Overlaminate 3640GPS, a clear 25.4 micrometer (0.001 inch) thick poly(vinylidene fluoride) film having a gloss finish; available from 3M Company, St. Paul, Minnesota. |
| 8518 | 3M SCOTCHCAL Gloss Overlaminate 8518, a clear overlaminate having a gloss finish; available from 3M Company, St. Paul, Minnesota. |

Test Methods

Tensile Modulus (Young's), Ultimate Stress, and Ultimate Strain

Modulus (Young's), ultimate stress, and ultimate strain (elongation) were measured according to ASTM D882-10: "Standard Test Method for Tensile Properties of Thin Plastic Sheeting" using the following parameters. Three straight section specimens measuring 25.4 mm (1 inch) wide, 100 mm (4 inches) long, and having a thickness generally between approximately 40 and 65 micrometers were cut from film samples in the downweb direction and conditioned for a minimum of 15 minutes at 22+/−2° C. prior to testing. The separation distance between parallel rubber covered grips was 50.8 millimeters, the crosshead speed was 304.8 mm/minute (12 inches/minute), and the strain rate was 6 $min^{-1}$ The separation rate, force measurements, and data calculations were carried out by the system controller.

Print Density

Printability was evaluated using an absolute print density test method according to ASTM D7305-08a: "Standard Test Method for Reflection Density of Printed Matter" and a Gretag SPM 50 LT spectro-densitometer having a 5 mm aperture on the measuring head. The spectral response was calibrated using a calibration plaque and found to be accurate to within 2%. A laminate of a 25 micrometer (0.001 inch) thick acrylic pressure sensitive adhesive layer on a white colored paper release liner was nip roll laminated at room temperature to an extruded film product prepared as described in "General Preparation of Films" below such that the surfaces of the adhesive and extruded film were joined together to give a film article. The exposed surface of the film article was then printed with primary color bars covering at least 15 cm² using a platen temperature setting of 65° C. (150° F.) with a VUTEK UltraVu II Model 150 SC printer (obtained from VUTEK, a division of EFI Corporation, Meredith, N.H.) and ink available under the tradename 3M 1500 V2 inks (available from 3M Company, Saint Paul, Minn.), and air dried for a minimum of 24 hours prior to measuring the print density of the color bars. At the time of sample printing, a piece of 3M™ Controltac™ Removable Graphic Film with Comply™ Adhesive 3545C is also printed. This material is a commercially available non-vinyl graphic arts film and is representative of the print quality available in non-vinyl films. The ink color density of the example film is compared to the ink color density of the commercial film by dividing the print density of the sample by the print density of the standard commercial and expressing the result as a percentage of standard performance. Achievements of 100% indicate equal color saturation. Values higher than 100% represent higher color saturation and values below 100% represent less saturation. Variations within 10% are often not visible without special patterns or instrumentation. Densitometers can determine variations within 2%. Current commercial PVC free films are considered to have inadequate print density.

Bleed

The tendency of one color to run into an adjacent color is defined as bleed. This characteristic is measured by printing a single black color with a contrasting (yellow) 1 mm stripe running through the middle and extending beyond the edge of the black section. The width of the stripe is measured within the black area and outside the black area. The ratio is listed as:

Bleed=Width of yellow line within the black area/
Width of the yellow line outside the black area.

A ratio of 1.0 indicates that the width of the colored line is the same with or without a background color. The narrow stripe will retain visibility, similar width, and good definition through the solid black color. This test can be affected by printer conditions so it is necessary to compare materials under the same print conditions. It may be possible to adjust printer conditions such that the performance of one material is improved at the expense of another.

Conformability

Conformability was evaluated using a tensile set test method according to ASTM D412-6d$^{e2}$: "Standard Test Methods for Vulcanized Rubber and Thermoplastic Elastomers—Tension" as follows. Test specimens having a width of 2.54 cm (1 inch) and a length of 10.2 cm (4 inches) were employed. The initial jaw separation distance on the film test specimen (50.8 mm) was marked (L0), then the specimen was stretched at a rate of 304.8 mm/minute (12 inches/minute) to 50% greater than its original length (76.2 mm, L1) and held for 30 seconds. The test specimen was then released from the jaw grips and after 24 hours the length between the original marks was re-measured (L24). Conformability, as measured by percent tensile set, was calculated as:

% Tensile Set=[(L24−L0)/(L1−L0)]×100 where L24 is the measured length after 24 hours, L0 is the initial jaw separation distance, and L1 is the 50% extended length. A tensile set value of 100% corresponds to zero elastic recovery. A film having such a value will remain in a stretched position without contracting. A tensile set value of 0% corresponds to complete elastic recovery.

General Preparation of Films

All films were extruded using a Type 2523 single screw extruder (C. W. Brabender, South Hackensack, N.J.) having a 1.90 cm (0.75 in.) diameter screw, a length of 61 cm (24 in.), and equipped with a Maddox element. The extruder was operated at a speed of 90 rpm, with a cooled feed throat, and the following, approximate zone and die temperatures: Z1: 182° C. (360° F.); Z2: 188° C. (370° F.); Z3: 193° C. (380° F.); Z4: 193° C. (380° F.); and die: 193° C. (380° F.). Zone temperatures were adjusted as needed, depending on the specific film formulations, to accommodate the melt viscosity of the input materials. Films were extruded through a 0.102 mm (0.004 inch) die gap onto a 15.2 cm (6 inch) wide polyester carrier film to provide a film product having a thickness of ca. 50 micrometers+/−15 micrometers (0.002 inches) and a width of between 10.2 and 15.2 cm (4 and 6 inches). The polyester carrier was removed from the film products prior to testing.

Films having the formulations shown in the tables below were prepared as described in "General Preparation of Films", then evaluated as described in the test methods above. The results are shown below.

TABLE 1

Formulations - Effect of Various Polyurethane, PVB, and additives.

Clear Examples

| Sample | PU1 | PU2 | PU3 | PU4 | PVB1 | PVB6 | A2 |
|--------|-----|------|------|------|------|------|------|
| C1 |     | 35.0 |      |      | 55.3 |      | 9.8  |
| C2 |     |      |      | 30.0 |      | 59.5 | 10.5 |
| C3 |     |      | 50.0 |      | 42.5 |      | 7.5  |
| C4 | 20.0|      |      |      |      | 68.0 | 12.0 |
| C5 |     |      |      | 35.0 | 55.3 |      | 9.8  |

White Examples

| Sample | PU1 | PU2 | PVB2 | PVB3 | PVB4 | PVB5 | PVB6 | A1 | A2 | A3 | A4 | A5 |
|--------|-----|-----|------|------|------|------|------|----|----|----|----|----|
| W1 |      | 30.0 |      |      |      | 43.6 |      |      | 7.7  |      |      | 18.7 |
| W2 | 30.0 |      | 43.6 |      |      |      |      |      | 7.7  |      |      | 18.7 |
| W3 |      | 27.5 |      | 40.6 |      |      |      |      | 10.2 |      |      | 21.8 |
| W4 | 27.5 |      |      |      | 40.6 |      |      |      | 10.2 |      |      | 21.8 |
| W5 | 27.5 |      | 40.6 |      |      |      |      | 10.2 |      |      |      | 21.8 |
| W6 | 30.0 |      |      |      |      |      | 41.6 |      | 7.3  |      |      | 21.0 |

TABLE 1-continued

Formulations - Effect of Various Polyurethane, PVB, and additives.

| W7 | 30.0 | | 41.6 | | 7.3 | 21.0 |
| W8 | 35.0 | 37.7 | | 7.8 | | 19.5 |

All samples were converted to pressure sensitive films by laminating the adhesive used in commercially available IJ 180-10, from 3M Company, to one surface of each of the films as previously described. These samples were then adhered to the non-adhesive surface of an aluminum panel to form an example film laminate typical of a graphic film used for vehicle decoration Samples are tested for various properties to determine suitability for use as a graphic film on compound, or curved, surfaces using the test methods previously described. The results of those tests performed on the samples as described are listed below.

TABLE 2

| sample | Color | Ultimate stress (N/sq mm) | Ultimate Strain (%) | Tensile modulus (N/sq mm) | % Tensile Set | Print density (as a % of 3545C) | Bleed |
| --- | --- | --- | --- | --- | --- | --- | --- |
| C1 | clear | 33.9 | 179.2 | 812 | 55% | 137% | 0.46 |
| C2 | clear | 41.9 | 222.5 | 1185 | 39% | 135% | 0.58 |
| C3 | clear | 71.8 | 252.9 | 334 | 90% | 132% | 0.50 |
| C4 | clear | 47.4 | 212.9 | 1215 | 36% | 136% | 0.41 |
| C5 | clear | 54.1 | 167.2 | 928 | 60% | 128% | 0.83 |
| W1 | white | 44.4 | 266.2 | 928 | 51% | 120% | 0.57 |
| W2 | white | 52.1 | 197.1 | 1166 | 50% | 128% | 0.58 |
| W3 | white | 25.9 | 188.4 | 624 | 69% | 126% | 0.52 |
| W4 | white | 43.5 | 243.6 | 650 | 66% | 121% | 0.40 |
| W5 | white | 40.1 | 193.1 | 1111 | 42% | 127% | 0.59 |
| W6 | white | 63.0 | 213.5 | 1422 | 34% | 123% | 0.60 |
| W7 | white | 53.6 | 197.2 | 1310 | 41% | 118% | 0.55 |
| W8 | white | 46.1 | 186.3 | 942 | 52% | 135% | 0.52 |
| 3545C | white | 14.4 | 283.5 | 251 | 89% | 100% | 0.38 |
| IJ180-10 | white | 20.3 | 170.8 | 931 | 73% | 143% | 0.54 |

Sample W8, printed on a Roland Versa Camm Print and Cut VS-540 IJ printer with Roland Eco Sol Max inks, and not printed, was converted to pressure sensitive films by laminating the adhesive and liner used in commercially available IJ 180Cv3-10, from 3M Company, to one surface of each of the films as previously described. This laminate and a comparative sample of a commercially available film-IJ 180-10, were applied to a 2010 Chevrolet HHR bumper using industry standard tools and techniques. The application of the example film laminate to the surface over the most complex contours of the bumper was comparable to an application using IJ180-10. After several days, the applications with the example film laminate and IJ 180-10 were examined for popoff and none was found.

Various modifications and alterations of the present invention will become apparent to those skilled in the art without departing from the spirit and scope of the invention. One can recognize the effect of individual components on the composite film and adjust the individual film or films to achieve the desired result.

What is claimed is:

1. A graphic film article comprising:
a conformable, extruded film layer comprising a polymer blend comprising a first polymer comprising only thermoplastic polyurethane and a second polymer comprising polyvinyl butyral, wherein the film layer is outdoor weatherable, the film has a first major surface and a second major surface opposite the first major surface, and at least one major surface is an exposed imageable film surface at least partially defined by the polymer blend that can receive an ink layer.

2. A graphic film article comprising
a conformable, extruded film layer comprising a polymer blend comprising a first polymer comprising only thermoplastic polyurethane and a second polymer comprising polyvinyl butyral;
an adhesive layer on a first major surface of the film layer; and
an exposed imageable surface at least partially defined by the polymer blend that can receive an ink layer on a second major surface of the film layer opposite the first major surface;
wherein the film layer further comprises a polyester plasticizer.

3. The article of claim 2 wherein the thermoplastic polyurethane is an aliphatic urethane.

4. The article of claim 2 wherein the thermoplastic polyurethane is an aromatic urethane.

5. The article of claim 2 wherein the film layer further comprises a colorant.

6. The article of claim 2 wherein the adhesive layer is a structured adhesive layer.

7. The article of claim 2 further comprising a primer layer between the adhesive layer and the film layer.

8. The article of claim 2 further comprising a release liner adjacent the adhesive layer opposite the film layer.

9. The article of claim 2 further comprising an image on the film layer.

10. The article of claim 9 further comprising a protective clear layer on the image.

11. The article of claim 2, wherein the article is fixed to a substrate.

12. The article of claim 11 wherein the substrate is a vehicle.

13. The article of claim 11 wherein the substrate has a rough surface.

14. The article of claim 11 wherein the substrate has a compound curved surface.

15. The article of claim 2 further comprising multiple film layers including the film layer.

16. A graphic film article comprising
a conformable, extruded film layer comprising a polymer blend comprising a first polymer comprising only thermoplastic polyurethane and a second polymer comprising polyvinyl butyral, wherein the film layer is less than 5 mil thick, the film has a first major surface and a second major surface opposite the first major surface, and at least one major surface is an exposed imageable film surface at least partially defined by the polymer blend that can receive an ink layer.

17. The article of claim 16 further comprising multiple film layers including the film layer.

18. The article of claim 16 further comprising an image on one surface of the film.

19. The article of claim 18 further comprising a protective clear layer on the image.

20. A method of displaying a graphic comprising
providing a substrate with an irregular surface;
applying the article of claim 2 to the substrate, wherein the adhesive layer adheres the article to the substrate.

21. The method of claim 20 wherein the substrate is a vehicle.

22. The method of claim 20 wherein the substrate has a rough surface.

* * * * *